United States Patent
Shadwell

(10) Patent No.: US 10,145,404 B2
(45) Date of Patent: Dec. 4, 2018

(54) FASTENER WITH PRESET SECURING MEMBER

(71) Applicant: OMG, Inc., Agawam, MA (US)

(72) Inventor: Peter J. Shadwell, Longmeadow, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 15/646,709

(22) Filed: Jul. 11, 2017

(65) Prior Publication Data

US 2018/0010627 A1    Jan. 11, 2018

Related U.S. Application Data

(60) Provisional application No. 62/360,510, filed on Jul. 11, 2016.

(51) Int. Cl.
| | |
|---|---|
| *F16B 25/00* | (2006.01) |
| *E04B 1/00* | (2006.01) |
| *E04F 15/02* | (2006.01) |
| *F16B 27/00* | (2006.01) |
| *F16B 43/00* | (2006.01) |

(52) U.S. Cl.
CPC .......... *F16B 25/0015* (2013.01); *E04B 1/003* (2013.01); *E04F 15/02183* (2013.01); *F16B 27/00* (2013.01); *F16B 43/00* (2013.01)

(58) Field of Classification Search
CPC ...... F16B 25/0015; F16B 27/00; F16B 43/00; E04F 15/02183
See application file for complete search history.

(56) References Cited

U.S. PATENT DOCUMENTS

| | | | | |
|---|---|---|---|---|
| 3,593,612 A | * | 7/1971 | Schulze ................. | F16B 13/02 411/15 |
| 5,713,709 A | * | 2/1998 | Huang ................... | F16B 27/00 206/345 |

(Continued)

FOREIGN PATENT DOCUMENTS

| | | | | |
|---|---|---|---|---|
| DE | 202014105374 U1 | * | 11/2014 | ............... F16B 43/00 |
| DE | 102014205682 A1 | * | 10/2015 | ........... B29C 65/562 |

(Continued)

OTHER PUBLICATIONS

International Search Report and Written Opinion dated Sep. 14, 2017 (PCT/US2017/041508).

*Primary Examiner* — Jeanette E Chapman
(74) *Attorney, Agent, or Firm* — Alix, Yale & Ristas, LLP

(57) ABSTRACT

A bushing includes an upper collar with a lower sheath and an annular shoulder intermediate the collar and sheath. The collar has a plurality of spaced apart notches and the sheath has a plurality of spaced apart slits that may be circumferentially aligned with the notches. The sheath has a plurality of spaced apart ribs projecting outward circumferentially offset from the slit for assisting in maintaining the sheath within a hole in a fastener with the annular shoulder against the fastener. A securing member with an elongate shank extending from a head with a distal portion is maintained in the longitudinal opening in an upright position aligned with the hole. As the fastener is driven longitudinally through the opening and hole, force from the fastener causes the bushing to break away and yields direct contact between the securing member head against the top surface of the fastener.

20 Claims, 15 Drawing Sheets

(56) References Cited

U.S. PATENT DOCUMENTS

| | | | |
|---|---|---|---|
| 6,238,127 B1 | 5/2001 | Jhumra et al. | |
| 6,896,460 B2 | 5/2005 | Enomoto et al. | |
| 7,984,599 B2 * | 7/2011 | Snell | E01C 5/005 52/586.1 |
| 2004/0118720 A1 * | 6/2004 | Powers | F16B 15/08 206/346 |
| 2004/0179919 A1 * | 9/2004 | Chen | F16B 27/00 411/443 |
| 2007/0172327 A1 | 7/2007 | Hansen | |
| 2007/0297870 A1 * | 12/2007 | Vrana | F16B 27/00 411/180 |
| 2009/0169324 A1 * | 7/2009 | Fritsch | F16B 5/02 411/4 |
| 2012/0292212 A1 * | 11/2012 | Lin | F16B 27/00 206/347 |
| 2012/0317789 A1 | 12/2012 | Moon et al. | |
| 2015/0300532 A1 * | 10/2015 | Karls | F16L 3/222 248/73 |
| 2017/0114536 A1 * | 4/2017 | Tebo | E04B 1/40 |

FOREIGN PATENT DOCUMENTS

| | | | | |
|---|---|---|---|---|
| JP | 2012042028 A | | 3/2012 | |
| JP | 3176141 U | * | 6/2012 | F16B 27/00 |
| WO | WO-2010000381 A1 | * | 1/2010 | F16B 27/00 |

* cited by examiner

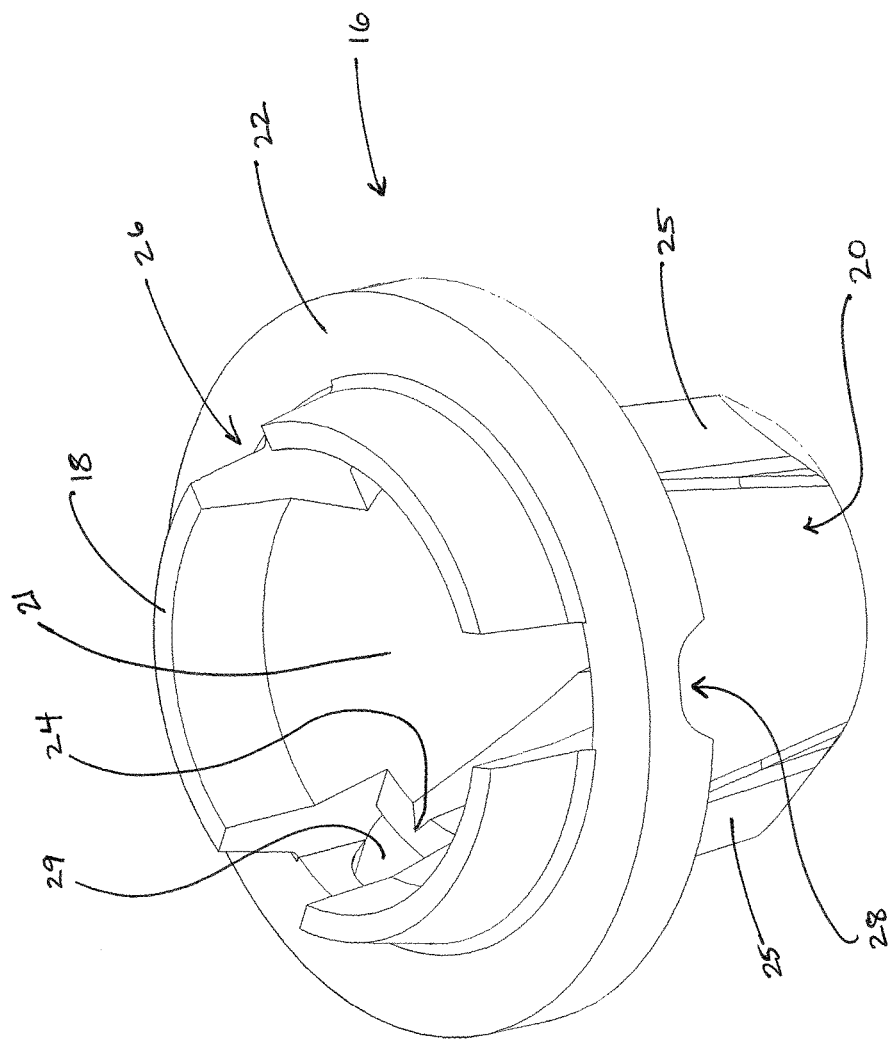

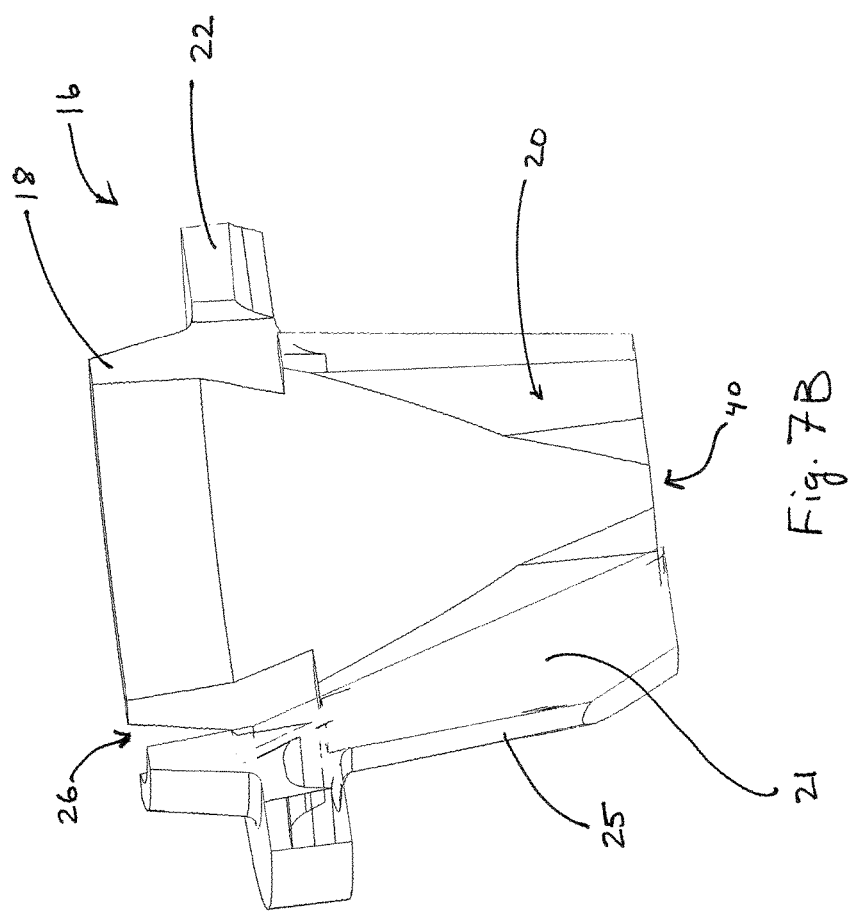

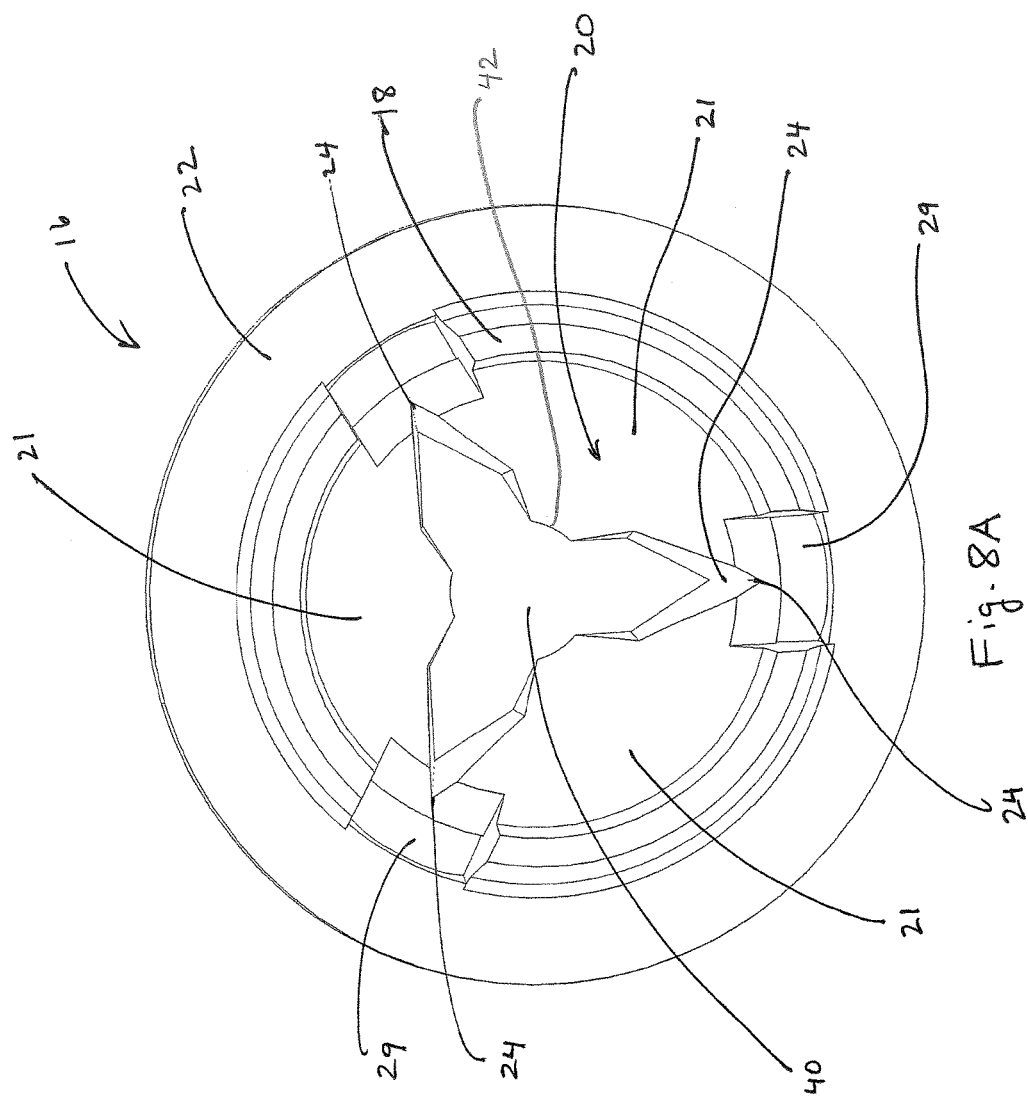

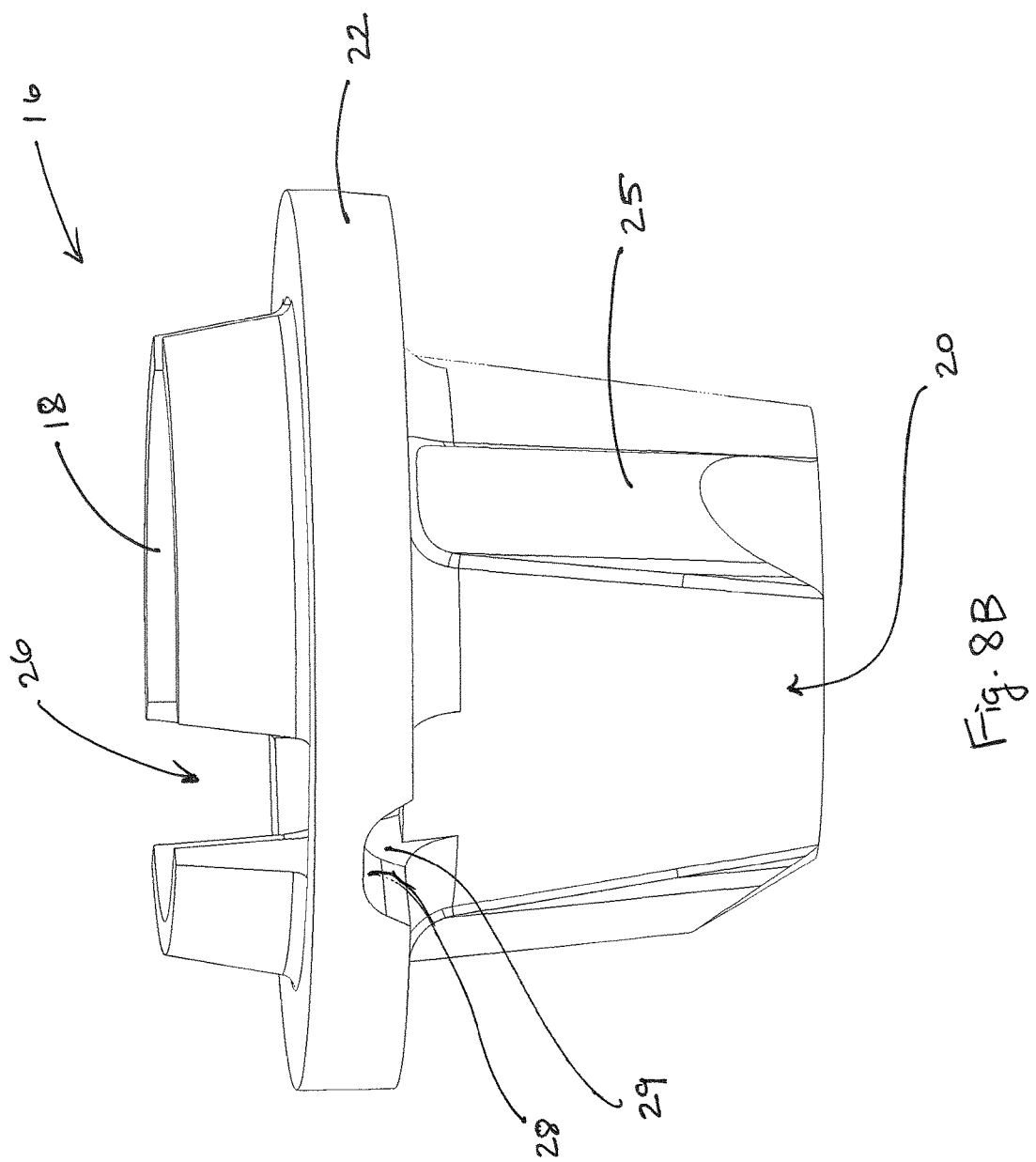

FASTENER WITH PRESET SECURING MEMBER

CROSS-REFERENCE TO RELATED APPLICATION

This application is a non-provisional that claims priority from U.S. Provisional Patent Application No. 62/360,510, filed on Jul. 11, 2016, for "Fastener with Preset Securing Member," the entire content of which is hereby incorporated by reference in its entirety.

BACKGROUND

This disclosure relates generally to the assembly of a building structure, for example, the installation of deck plank fasteners or clips for securing a deck plank to a joist and for supporting deck planks relative to one another to install a deck. More particularly, the present disclosure relates to fasteners with preset elongate securing members (screws) and an inventive intermediate breakaway sleeve (bushing) that allows the securing members to fully and directly contact the fasteners in the installed position.

Deck plank fasteners for planks with undercut side grooves exist, and are well known in the relevant field. Recent advancements in the technology of fasteners have been made to allow for versatility, improved attachment strength and rigidity, as well as ease and quickness of installation, which advancements are disclosed in co-owned pending U.S. patent application Ser. No. 14/434,268 filed Apr. 8, 2015 (U.S. Application Publication No. 2015/0275951), the entire contents of which is incorporated herein by reference. U.S. Publication No. 2015/0275951 discloses a universal hidden deck fastener that may be attached to other similar fasteners in a front-to-rear alignment to form an attached collated strip. U.S. Publication No. 2015/0275951 also discloses a power driving tool, such as a compressed air tool, configured for automatic installation of hidden deck fasteners like those disclosed.

Many installers prefer to install fasteners by hand, rather than using an automatic power driving tool. Presently, these installers are required to handle each small fastener in their hands, locate a securing member (usually a loose screw or other elongate threaded fastener), place and maintain the fastener in the proper installation position relative to the plank and decking support structure, and finally drive the securing member in the proper position through the fastener to install the decking plank. Such a process is very time consuming, and lends itself to inconsistent fastener alignment and results due to the handheld positioning. In addition to the specific installation of a decking fastener described herein, there are a multitude of similar fasteners or building elements that currently require handheld alignment and maintenance of a securing member with a hole, a process that invites mistakes and inconsistent results.

Fastening products, such as decking fasteners, currently exist with a permanent plastic section for presetting a threaded securing member. The plastic section allows a screw to be preset in an attachment opening prior to a user driving the screw through the opening to install the fastener. However, fasteners with a plastic section naturally suffer drawbacks such as lower strength, rigidity and durability as compared to similar fasteners that have a metal-on-metal relationship with the securing member when installed. The plastic-on-metal connections that currently exist are subject to greater fatigue and easily become loose or damaged over time. There are currently no products that include a preset securing member directly within a metal opening in a fastener, primarily because such a product would be susceptible to stripping of the metal surfaces of the opening and/or securing member threads. Thus, there is a need for a fastener with an effective preloaded securing member that avoids possibility of stripping of metal surfaces when preloaded and allows a metal-on-metal attachment when installed.

SUMMARY

In one embodiment, a bushing for locating a securing member with an elongate shank extending from head in in a hole in a fastener includes an upper collar, a lower sheath and an annular shoulder between the collar and sheath. The upper collar, lower sheath and annular shoulder cooperate to define a passage substantially aligned with the hole in the fastener for supporting the securing member in a substantially upright position aligned with the hole. When the shank of the securing member is driven through the opening, the fastener causes the bushing to separate, thereby yielding direct contact between the securing member and the fastener.

In another embodiment, a break-away fastening unit for assembling a building structure is disclosed. The fastening unit includes a fastener, a securing member and a bushing. The fastener has a top surface and a bottom surface and defines an attachment hole. The securing member includes an elongate shank extending from a head to a distal end and is configured for driving into a building member. The bushing has a lower sheath positioned within the attachment hole of the fastener with an annular shoulder positioned on the top surface side of the fastener. The sheath and shoulder combine to define a longitudinal passage for receiving and maintaining at least a distal portion of the securing member shank with the securing member in a substantially upright position and the bushing pressed between the fastener and securing member. Driving the securing member shank distally through the bushing breaks away the bushing, thereby yielding direct contact between the securing member against the fastener.

BRIEF DESCRIPTION OF THE DRAWINGS

FIG. 7A is a top perspective view of the bushing of FIGS. 1-5;

FIG. 7B is a section view of the bushing of FIG. 7A;

FIG. 8A is a top elevation view of the bushing of FIG. 7A;

FIG. 8B is a side elevation view of the bushing of FIG. 7A;

DETAILED DESCRIPTION

Among the benefits and improvements disclosed herein, other objects and advantages of the disclosed embodiments will become apparent from the following wherein like numerals represent like parts throughout the several figures. Detailed embodiments of a bushing and fastener with preset securing members are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Figure 6:
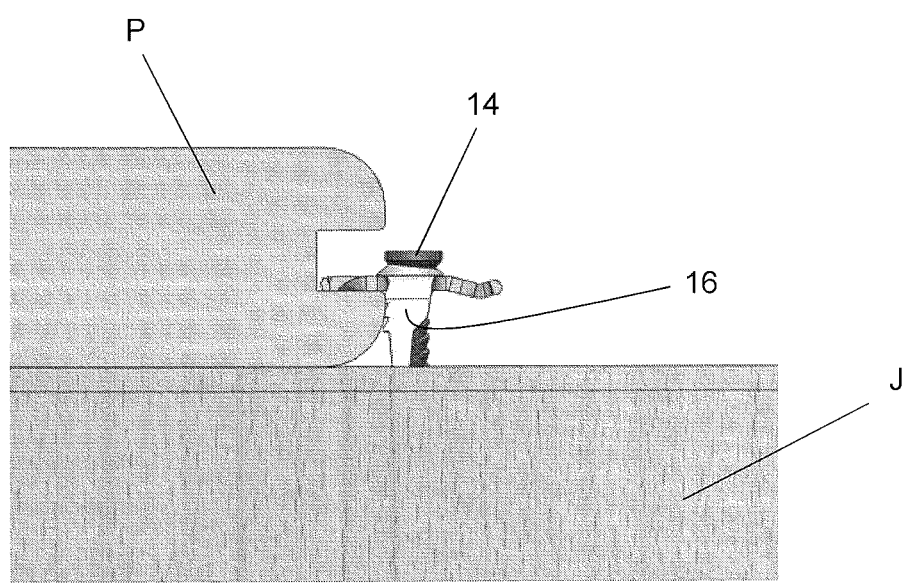
FIG. 6 shows an exemplary installation of a fastener and securing member after the bushing has broken away during installation.
Figure 9:
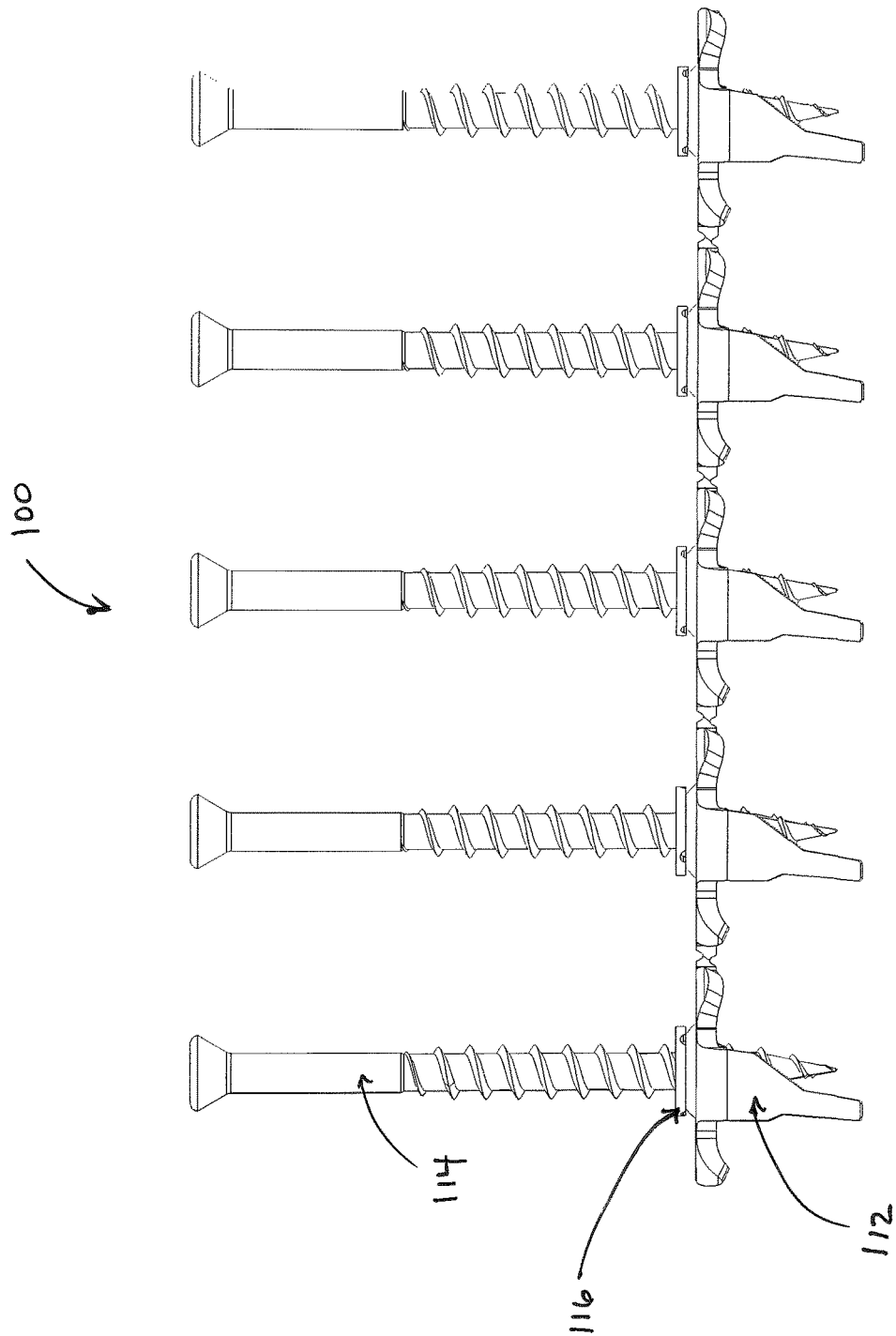
FIG. 9 is a side elevation view of a collated series of fasteners with preset securing members held in place with a different embodiment of the bushing.

With reference to the drawings wherein like numerals represent like parts throughout the several figures, embodiments of a bushing 16 and a decking fastener 12 with a preset securing member 14 and intermediate bushing 16, optionally in a collated series 10 are disclosed. As will be evident from the below description, the intermediate sleeve or bushing 16 allows an effective preset relationship without risking damage to the securing member threads or fastener opening surfaces or edge. The bushing 16 is typically manufactured from a plastic material and configured to break away from the unit during installation, leaving the desired direct metal-on-metal direct attachment between the fastener 12 and securing member 14. An illustrative depiction of an installation of the fastener 12 via securing member 14 after the bushing 16 has broken away is shown in FIG. 6.

Figure 1:
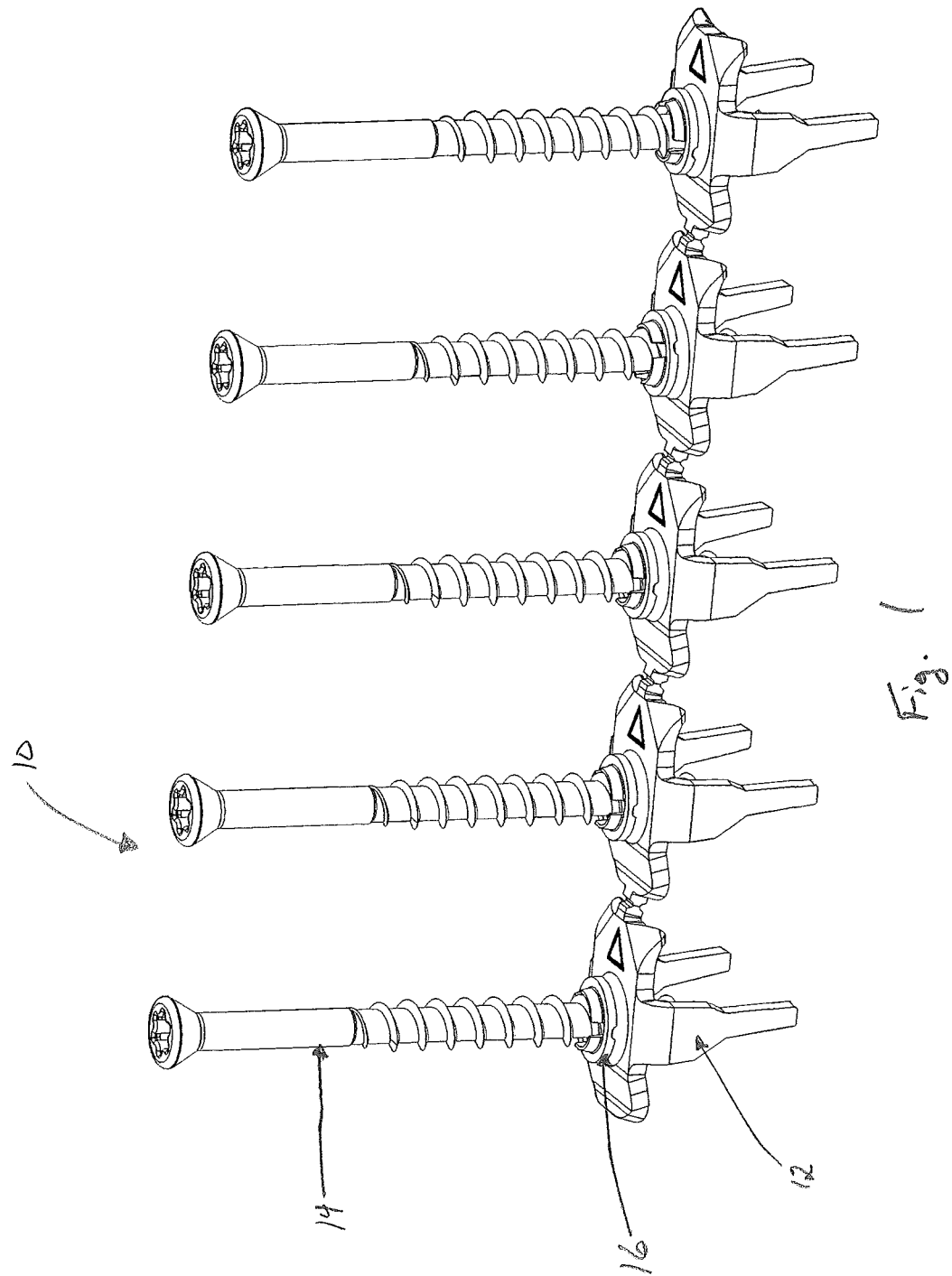
FIG. 1 is a top perspective view of an embodiment of a collated series of fasteners with preset securing members.
Figure 2:
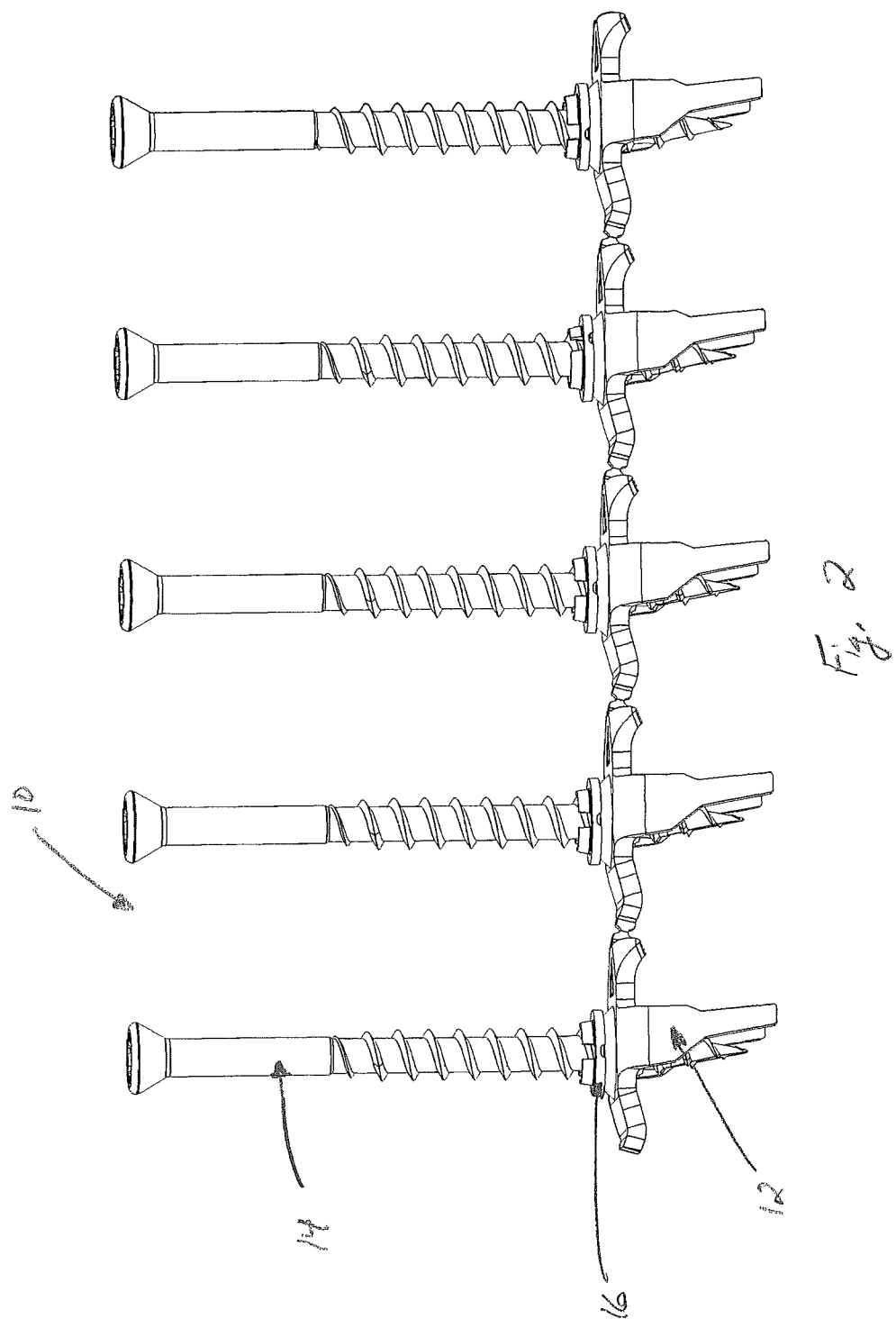
FIG. 2 is a side elevation view of the series of fasteners of FIG. 1.

FIGS. 1 and 2 depict a collated series 10 of fasteners 12, similar to those described in co-owned pending U.S. patent application Ser. No. 14/434,268. As shown, the fasteners 12 each have a threaded securing member 14 preset within a hole extending through the top of the fastener, maintained in its upright position via an intermediate bushing 16.

Figure 3:
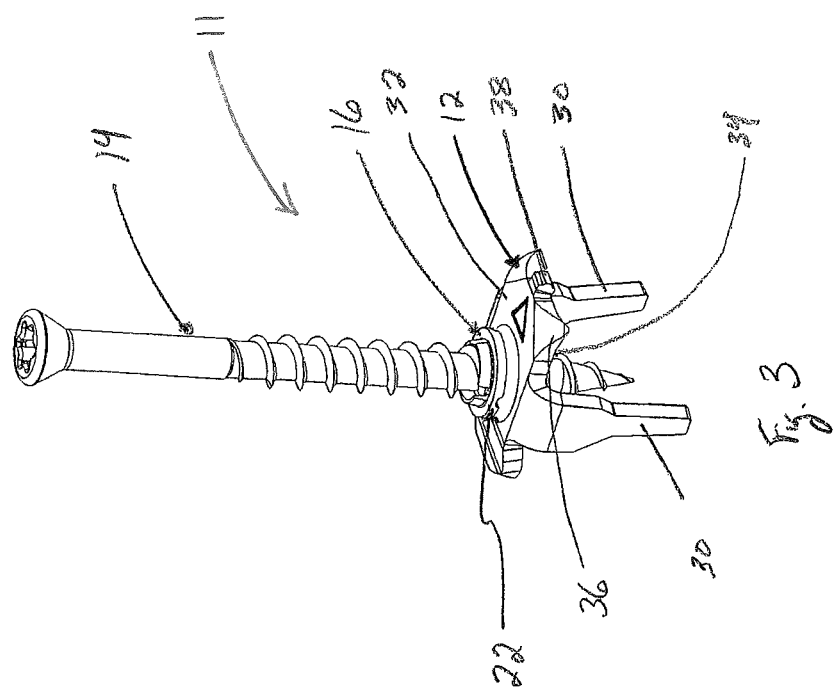
FIG. 3 is a top perspective view of a single fastener with preset securing member and intermediate bushing.

FIG. 3 depicts a single securing member 14 that is preset in fastener 12 with bushing 16. Prior to installation, the shape of the bushing 16 (as depicted in FIGS. 7A-8B) is configured to accommodate the shape of the tip of the securing member 14 to properly locate and support the tip and/or distal portion of the securing member 14. As the securing member 14 is inserted or driven further through the fastener hole and the bushing 16, portions of the bushing 16 expand and/or flare outward until the bushing 16 ultimately breaks away, yielding a secure metal-on-metal connection between the securing member 14 and the fastener 12.

Referring to FIG. 3, showing a singular preset assembly 11, the exemplary fastener 12 has two opposing downwardly extending legs 30. The fastener 12 extends from a generally planar top surface 32 to a generally planar bottom surface 34 with a hole between the top and bottom surfaces. In the depicted embodiment, a plurality of teeth 36 extend downwardly at the front end of the body. Additional embodiments of the fastener for use with the disclosed bushing and preset fastener system exist that feature downwardly projecting prongs at the rear end. A nose 38 protrudes from the fastener 12 between the top and bottom surfaces 32, 34. The nose 38 allows for temporary mating of adjacent fasteners within the collated series 10 depicted in FIGS. 1 and 2. It is important to note that the particular configuration of the fastener is non-limiting to the inventive aspects disclosed herein, which can be employed in numerous different multi-part fastening systems.

Figure 4:
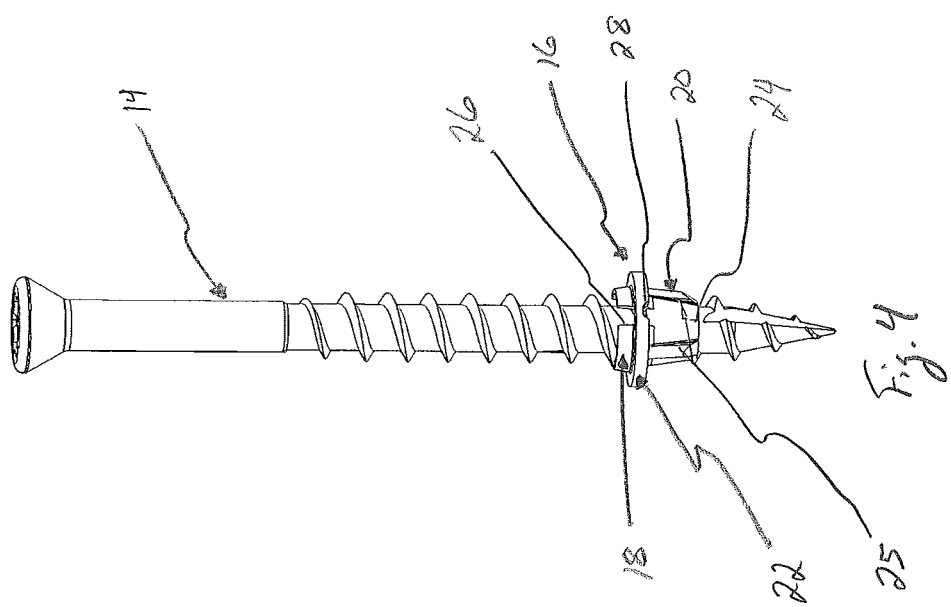
FIG. 4 is a side elevation view of a securing member and intermediate bushing with the fastener removed.
Figure 5:
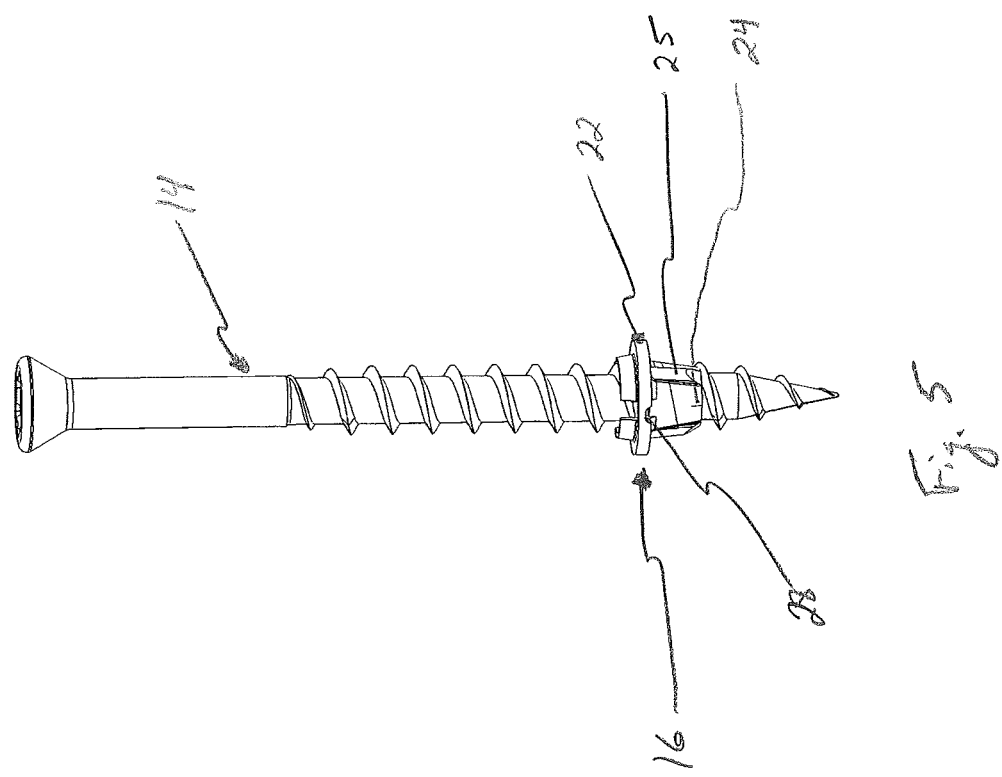
FIG. 5 is a side elevation view of a securing member and intermediate bushing with the fastener removed at a different angle from FIG. 4.

FIGS. 4 and 5 depict a securing member 14 within a bushing 16 with the fastener 12 removed to allow features of the bushing 16 and the relationship between the bushing 16 and fastener 14 to be appreciated in greater detail. As shown, the bushing includes an upper collar 18 and a lower sheath 20 separated with an outwardly extending annular shoulder or flange 22 intermediate the collar and sheath. When installed in the preset assembly or individual fastener, as depicted in FIGS. 1-3, the annular shoulder 22 abuts the top surface of the fastener to assist in maintaining the securing member 14 in its upright configuration aligned with the hole in the fastener 12.

The lower sheath 20 includes a plurality of slits 24 circumferentially spaced from one another, dividing the sheath into segments 21. In the depicted exemplary embodiment, the lower sheath 20 has three slits 24 equally spaced approximately 120° apart from each other. Thus, the lower sheath 20 can be considered to comprise three substantially identical segments 21, each segment being defined between successive slits. Notably, the number of slits and their relative positioning around the lower sheath described herein as preferred are non-limiting to the bushing 16 and the collated or individual preset assemblies, 10 and 11. In practice, the slits 24 allow the separate segments 21 of the lower sheath 20 (between adjacent slits) to separate (flare) radially outward underneath the surface of the fastener 12 when the securing member 14 is driven partially through the hole with the annular shoulder 22 abutting the top surface of the fastener and providing mechanical leverage. As shown in the Figures, a plurality of ribs 25 project radially from the outer surface of the lower sheath 20. In the depicted embodiment, three ribs 25 are equidistantly spaced radially offset between the respective slits 24, such that each sheath segment 21 includes a rib 25. The ribs 25 assist in creating a press fit between the bushing 16 and the edge that defines the hole in the fastener 12, and help maintain the securing member 14 in an upright position prior to installation.

Further, the lower sheath 20 has a contour that transitions inwardly toward its distal end, forming a substantially frustoconical outer contour. Additionally, with reference to the cross-section of FIG. 7B, the inner passage defined by the lower sheath 20 takes a modified, somewhat frustoconical shape that is tighter (or narrower) than the outer frustoconical shape. These characteristics and relationships have been shown to be advantageous in providing mechanical leverage for splitting the bushing 16 via the driven securing member 14. During installation, each of the sheath segments 21 and the associated ribs 25 are forced away from the securing member 14 in a flared motion outward and upward towards the bottom surface 34 of the fastener 12. In addition to maintaining the securing member 14 in its upright aligned position before installation, the ribs 25, in combination with the annular shoulder 22, help prevent the securing member 14 from being pulled back out of the fastener 12 in the installed position. As shown most clearly in the cross-sectional view of FIG. 7B and the top elevation view of FIG. 8A, the inner surface of each segment 21 of the lower sheath 20 also transitions inwardly toward the distal end, and includes a series of spaced apart nubs 42. Each nub 42 is substantially circumferentially aligned with a rib 25 intermediate successive slits 24 in the lower sheath 20. The inward nubs 42 assist in maintaining a tight and secure fit with the elongate securing member 16 prior to driving the securing member through the hole, and further provide an abutment surface with the securing member to initiate the outward expansion or flaring action of each sheath segment 21 as the securing member is driven through.

As shown in the Figures, the upper collar 18 extends upward away from the annular shoulder 22 such that the collar 18, sheath 20 and intermediate annular shoulder 22 of the bushing combine to form an inner passage 40 for holding the securing member. The upper collar 18 includes a plurality of notches 26 that are substantially equidistantly spaced along its circumference. In the depicted embodiment, the notches 26 extend through the majority or entirety of the axial length of the upper collar 18 from an open portion in the collar upper edge. Preferably, the notches are additionally substantially aligned with the slits 24 in the lower sheath and an opening 29 in the annular shoulder (discussed in greater detail below). In the assembly and during operation, the upper collar 18 provides additional axial height and leverage to increase the points of contact between the bushing 16 and the securing member 14, thereby maintaining the securing member tightly in its upright position aligned with the fastener hole in its initial position and as the securing member is driven through the hole. The upper collar 18 may have a height that is at least 1.5 threads of the securing member 14. Such a height ratio ensures at least three points of contact (and in some orientations four points of contact) between the securing member 14 and the bushing 16, which assists in maintaining the securing member 14 rigid and upright within the bushing 16.

Referring to FIGS. 5, 7A and 8B, a plurality of indentations 28 interrupt the annular shoulder 22. While not visible in the elevation views, the indentations 28 are circumferentially spaced from one another around the shoulder 22. Preferably, three indentations 28 are evenly spaced about the circumference of the shoulder 22, with an indentation substantially circumferentially aligned with each slit 24 in the lower sheath 20 and each notch 26 in the upper collar 18. As can be seen best in FIGS. 7A and 8B, in the depicted embodiments, each indentation 28 extend radially inwardly through the entire radial extent of the shoulder 22 and meet an aligned notch 26, defining a radial opening 29. The described and depicted characteristics and relationships between the aligned slits 24, notches 26, and indentations 28, with openings 29, as well as the contours of the lower sheath 22 cooperate to allow the separation and breaking away of the intermediate bushing 16 into a plurality of distinct sections by the outward force from a securing member 14 being driven into the fastener 12.

In a typical installation of a fastener 12, a user first aligns the fastener against the appropriate building member or members, for example, within a side groove of a decking plank supported by a joint. The user can then drive the securing member 14 downward through the hole in the fastener and thus through the bushing 16. As the securing member 14 is driven further through the bushing 16, and specifically through the nubs 42 in the lower sheath segments 21, the force from the securing member pushes the distinct segments 21 between the slits 24 outward in a flaring action with the annular shoulder 22 against the upper surface of the fastener. This outward flaring action thus causes the sheath 20 to split along at least one slit 24, preferably along multiple slits. As the securing member is driven further through the bushing 16, the splits along the slits 24 in the lower sheath 20 may continue through the annular shoulder 22 along the indentations 28 and openings 29. Indeed, the bushing 16 may separate into three distinct segments, but a full three-way separation is not required for the bushing to break away to yield a direct metal-on-metal contact between the fastener 12 and securing member 14 in an installed position with the securing member driven into a decking joist and the fastener securing a decking plank relative to the joist (or other building members).

Notably, the above description of an installation using the fastener preset with a securing member via a break-away bushing is with reference to a preferred setting of assembling a decking structure. The inventive embodiments of the bushing and assembly disclosed herein are in no way limited to use in assembling a decking structure with the specific fastener. Countless additional building members and structures can be assembled or formed with different styles of fasteners utilizing the inventive bushing that breaks away during installation to yield a direct metal-on-metal engagement (and associated combination assemblies that utilize such a bushing).

As discussed above and depicted most clearly in FIGS. 7A-8B, the upper collar 18, annular shoulder 22 and lower sheath 20 all include elements and characteristics that promote splitting of the bushing into radial sections. Notably, not all of the elements and characteristic are necessary, and in some applications, a sub-combination of the described elements that promote splitting and breaking away of the bushing 16 are sufficient.

In another preferred embodiment depicted in FIGS. 9-13, a bushing 116 includes a lower sheath 120 and an upper annular shoulder 122 only (without an upper collar). In this embodiment, the annular shoulder 122 and lower sheath 120 are substantially identical to the like elements (20 and 22) in the embodiment shown in FIGS. 1-8B, including surfaces, shapes, relationships and sub-elements. The lower sheath has a series of slits 124 spaced from one another along the circumference of the sheath with an outwardly projecting rib 125 and an inwardly projecting nub 142 positioned on a segment 121 of the sheath between each slit 124. In this particular depicted embodiment, the sheath 120 also has three slits evenly spaced from one another, and thereby defines three substantially similar segments 121. As shown, an inner passage 140 extends through the sheath 120 and annular shoulder 122 for maintaining the securing member 114.

Figure 10:
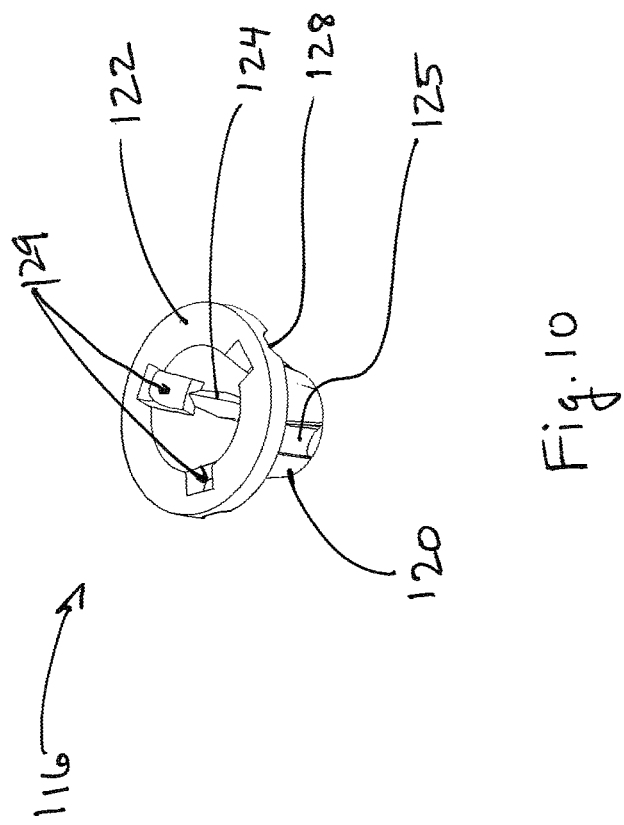
FIG. 10 is a top perspective view of the additional embodiment of the bushing from FIG. 9.
Figure 11:
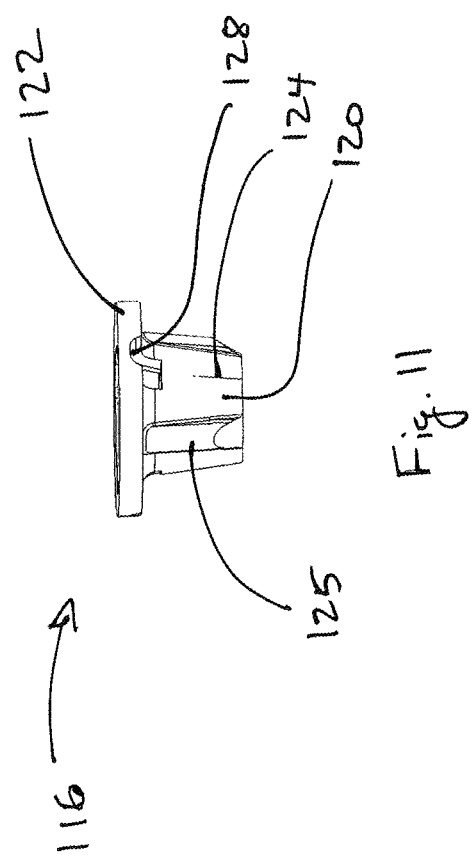
FIG. 11 is a side elevation view of the bushing of FIG. 10.
Figure 12:
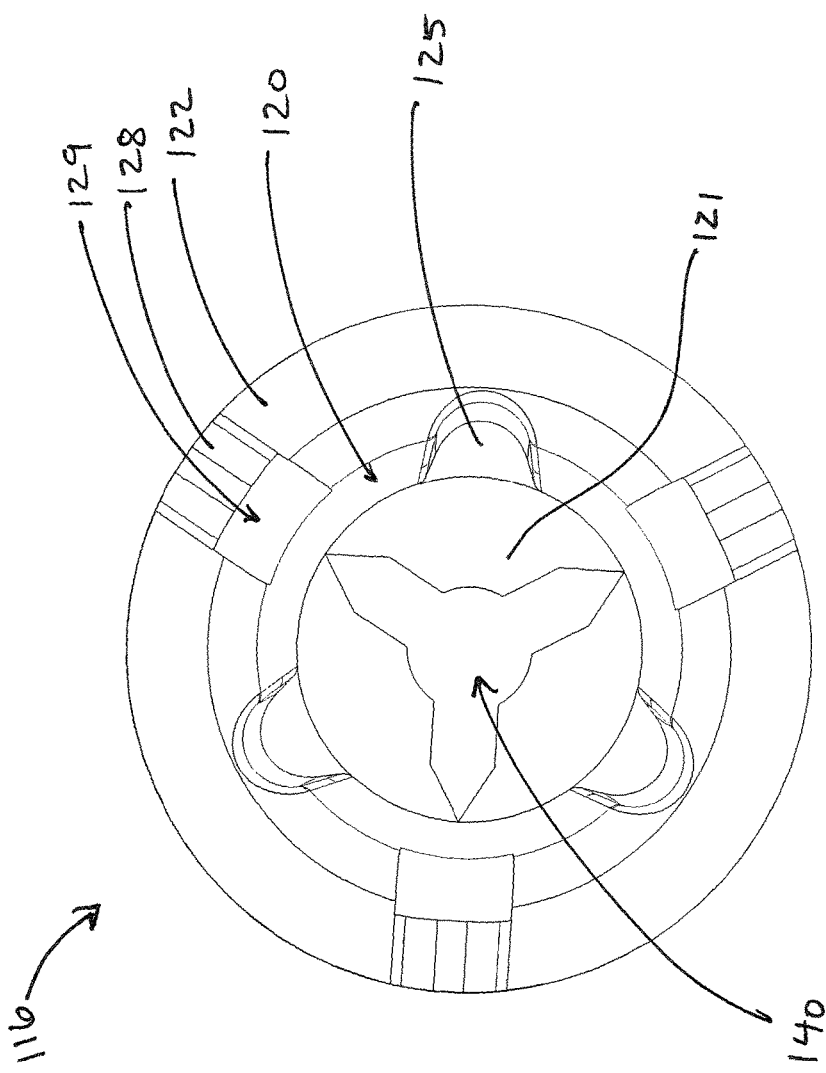
FIG. 12 is a bottom elevation view of the bushing of FIG. 10.
Figure 13:
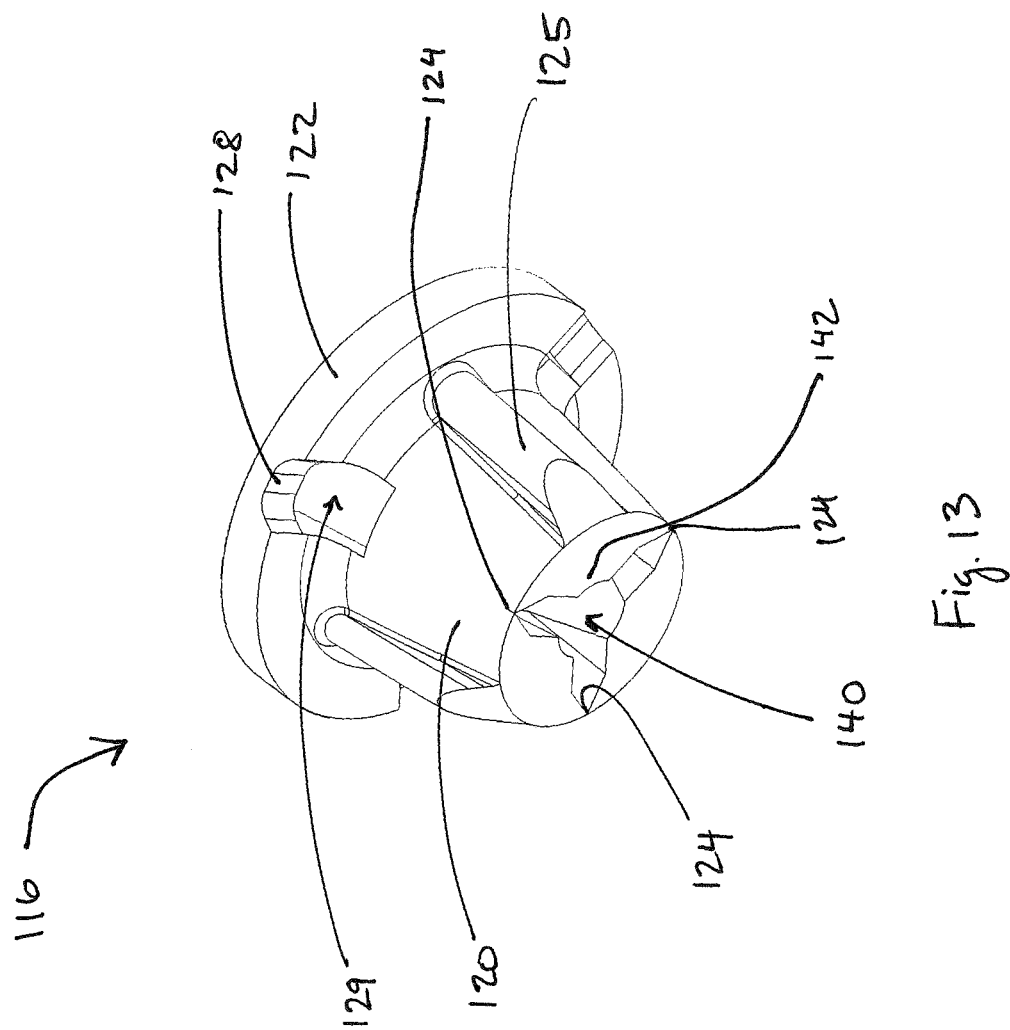
FIG. 13 is a bottom perspective view of the bushing of FIG. 10.

As seen in FIG. 10, the bushing 116 includes indentations 128 in the annular shoulder 122, with each indentation leading to a proximal opening 129 in the shoulder. Like the above embodiment, a slit 124, indentation 128 and opening 129 are aligned to promote splitting of the sheath segments 121 along the slits 124. Essentially, the elements, sub-elements and relationships within the embodiment of the bushing 116 are substantially the same as those within the embodiment of the bushing 16, except for the presence of the upper collar 18 and its features in the bushing 16. The bushing 116 has shown to be suitable for maintaining and supporting smaller securing members for which less axial leverage is required above the annular shoulder.

In preferred embodiments of the disclosed fastener assembly, 10 and 110, and bushing, 16 and 116, the bushing can be molded of a plastic material. The securing member and fastener are typically formed of a metal, such as galvanized steel, for example, optionally coated and/or heat treated. Of course, other metals can be use for these elements.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the coverage.

What we claim is:

1. A bushing for locating a securing member with an elongate shank extending from head in in a hole in a fastener, comprising:
   an upper collar;
   a lower sheath with an outer surface and an inner surface, a plurality of ribs projecting radially from the outer surface and being spaced from one another about the sheath, and a plurality of nubs extending inwardly from the inner surface and being spaced apart from one another about the sheath, each rib being substantially circumferentially aligned with a nub; and
   an annular shoulder intermediate the upper collar and lower sheath; wherein
   the upper collar, lower sheath and annular shoulder combine to define an passage substantially aligned with the hole in the fastener for supporting the securing member in a substantially upright position aligned with the hole, and when the shank of the securing member is driven through the opening, the fastener causes said bushing to separate, thereby yielding direct contact between the securing member and the fastener.

2. The bushing of claim 1, comprising a plurality of notches in the upper collar spaced from one another about the collar.

3. The bushing of claim 2, wherein the notches extend from an open in a top edge of the collar axially through at least a majority of said collar.

4. The bushing of claim 2, wherein the notches are circumferentially spaced substantially evenly about the collar.

5. The bushing of claim 2, comprising a plurality of slits in the lower sheath spaced from one another about the lower sheath, wherein at least one of the slits is substantially circumferentially aligned with a notch in the upper collar.

6. The bushing of claim 2, comprising a plurality of indentations in the annular shoulder spaced from one another about the shoulder, wherein at least one of the indentations is circumferentially aligned with a notch in the upper collar.

7. The bushing of claim 2, comprising a plurality of slits in the lower sheath spaced from one another about the lower sheath and a plurality of indentations in the annular shoulder spaced from one another about the shoulder.

8. The bushing of claim 7, wherein the notches in the upper shoulder and the slits in the lower sheath are substantially circumferentially aligned with one another.

9. The bushing of claim 8, wherein the indentations are substantially circumferentially aligned with the notches and the slits.

10. The bushing of claim 1, comprising a plurality of slits in the lower sheath spaced from one another about the lower sheath.

11. The bushing of 10, wherein the ribs are spaced from one another about the sheath with each of said ribs being substantially circumferentially offset from the slits.

12. The bushing of claim 1, comprising a plurality of indentations in the annular shoulder spaced from one another about the shoulder.

13. A bushing for locating a securing member with an elongate shank extending from head in in a hole in a fastener, comprising:
   a sheath with an upper end and a lower end, having an outer surface and an inner surface, a plurality of ribs projecting radially from the outer surface and being spaced from one another about the sheath, and a plurality of nubs extending inwardly from the inner surface and being spaced apart from one another about the sheath, each rib being substantially circumferentially aligned with a nub; and
   an annular shoulder proximate the upper end of the sheath, the shoulder having a top surface and a bottom surface; wherein
   the sheath and annular shoulder combine to define a passage for receipt of an elongate securing member in a substantially upright position aligned with a hole in a fastener with the bottom surface abutting a top surface of the fastener and the sheath within the fastener hole.

14. The bushing of claim 13, comprising a collar extending from the top surface of the annular shoulder, the collar forming part of the passage.

15. The bushing of claim 13, wherein a portion of the passage narrows from the sheath upper end toward the sheath lower end.

16. The bushing of claim 13, comprising a series of openings in the annular shoulder circumferentially spaced from one another.

17. The bushing of claim 16, wherein the ribs in the sheath are circumferentially offset from the openings in the annular shoulder.

18. The bushing of claim 13, comprising a plurality of slits in the lower sheath spaced from one another about the lower sheath, wherein at least one of the slits is substantially circumferentially aligned with a notch in the upper collar.

19. The bushing of claim 18, wherein the ribs and nubs are substantially circumferentially offset from the slits.

20. The bushing of claim 13, comprising a plurality of indentations in the annular shoulder spaced from one another about the shoulder, wherein at least one of the indentations is circumferentially aligned with a notch in the upper collar.

\* \* \* \* \*